(12) United States Patent
Kim et al.

(10) Patent No.: US 6,625,110 B2
(45) Date of Patent: Sep. 23, 2003

(54) CONTAMINATION PREVENTING DEVICE OF OPTICAL HEAD FOR NEAR FIELD RECORDING

(75) Inventors: Soo-Kyung Kim, Seoul (KR); In-Sang Song, Kyoungki-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/033,025

(22) Filed: Dec. 26, 2001

(65) Prior Publication Data

US 2002/0085473 A1 Jul. 4, 2002

(30) Foreign Application Priority Data

Dec. 28, 2000 (KR) .................................. 10-2000-83743
Dec. 28, 2000 (KR) .................................. 10-2000-83694
Dec. 28, 2000 (KR) .................................. 10-2000-83745

(51) Int. Cl.[7] .............................. G11B 3/58; G11B 7/08
(52) U.S. Cl. ........................................ 369/300; 369/71
(58) Field of Search ............................ 369/300, 71, 72, 369/73, 74; 360/128, 294.4, 137

(56) References Cited

U.S. PATENT DOCUMENTS 5,243,591 A * 9/1993 Mogamiya .................. 369/219
6,028,830 A * 2/2000 Fritsch et al. .................. 369/71
6,084,743 A * 7/2000 Comstock et al. ....... 360/97.02
6,292,323 B1 * 9/2001 Tanaka et al. ................. 360/75
6,307,832 B1 * 10/2001 Novotny et al. ......... 369/13.33
6,339,517 B1 * 1/2002 Cheong ...................... 360/128

FOREIGN PATENT DOCUMENTS

| JP | 54143212 A | * 11/1979 | ............. G11B/3/58 |
| JP | 04311829 A | * 11/1992 | ............. G11B/7/12 |
| JP | 06-020232 | * 1/1994 | ............. G11B/5/41 |

* cited by examiner

*Primary Examiner*—William Korzuch
*Assistant Examiner*—Jennifer M Dolan
(74) *Attorney, Agent, or Firm*—Lee & Hong

(57) ABSTRACT

A contamination preventing device of an optical head for near field recording includes a slider being supported by a suspension in a deck and having a collective hole vertically penetrated though which a light source is transmitted; a collective lens being installed at a lower portion of the collective hole of the slider, collecting light generated from the light source and forming a spot at an upper surface of a recording medium; and a lens contaminant removing means removing a foreign substance clung to the collective lens. When the surface of the collective lens mounted at the slider is exposed to contaminant substances while performing interaction with the surface of the recording medium in the near field optical recording or reproducing, the lens surface can be easily cleansed to remove the contaminant of the surface of the lens immediately.

23 Claims, 5 Drawing Sheets

CONTAMINATION PREVENTING DEVICE OF OPTICAL HEAD FOR NEAR FIELD RECORDING

BACKGROUND OF THE INVENTION

1. Field of the Invention

The present invention relates to an optical head of a high density disk driver using a near field optical system, and more particularly, to a contamination preventing device of an optical head for a near field recording by having a contamination preventing unit for preventing a collective lens of a slider from contaminating by foreign substance.

2. Description of the Background Art

With the rapid development of networks and information technology, a recording capacity of a hard disk or an auxiliary storing unit of a computer is being increased. The increase in the recording capacity is due to a necessity of a means for recording large capacity image information or data information.

In case of the hard disk, its recording capacity is increased by 60% every year contrasting with its former year. In case of an optical disk drive for a computer auxiliary memory unit, it has an information storage capacity ranging from a few gigabit to scores of gigabit.

However, the storage capacity of the current information storage unit is likely to have a limitation in view of a technological development.

Recently, a near field recording (NFR), emerging as a next-generation information storage unit, is capable of accommodating a voluminous amount of data information and is expected to be able to meet the information storage requirement in the future.

A near field optical system realizing the near field information recording technology overcomes a diffraction limitation of a far field optical system adopted to an optical disk and allows a high density recording and reproducing by using an optical fiber or a new collective lens (i.e., solid immersion lens (SIL)).

Figure 1:
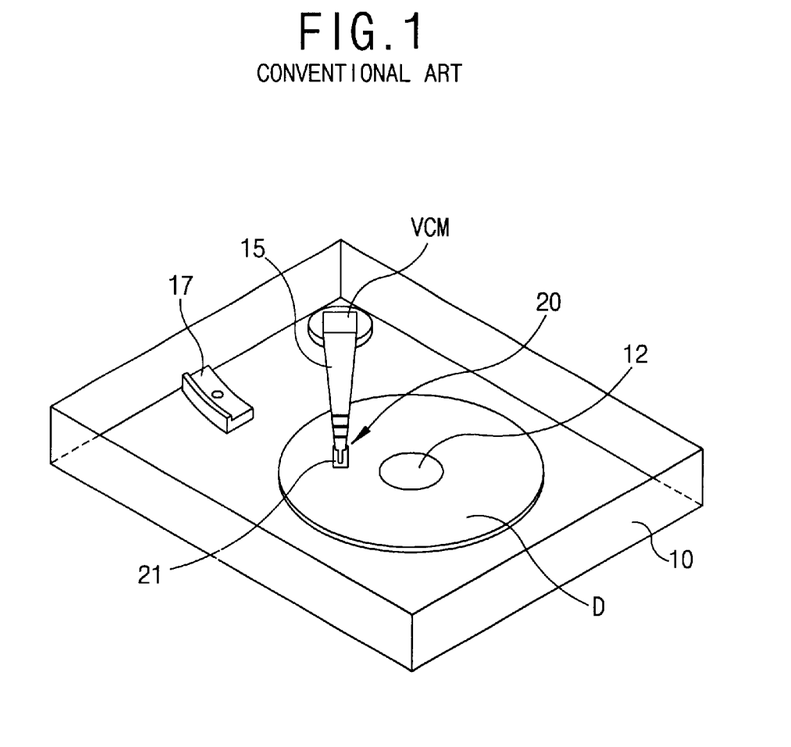
FIG. 1 is a schematic perspective view of a disk driver having an optical head for a near field recording in accordance with a conventional art.

FIG. 1 is a schematic perspective view of a disk driver having a near field optical head.

With reference to FIG. 1, a driver includes a drive 10 mounting a disk therein; a spindle motor 12 rotating the disk (D) installed and mounted within the drive 10; a suspension 15 rotated by being connected to a VC motor (VCM) installed in the drive (10); an optical head 20 installed at an end portion of the suspension 15, and recording or reproducing information into or from the disk (D); and a landing plate 17 installed at one side of the drive 10, where the optical head 20 is positioned when the disk (D) is not mounted.

The optical head includes two lenses installed at a vertically penetrated collecting hole, so that when the suspension 15 is rotated upwardly of the disk (D) according to the operation of the VC motor, the optical head 20 records information into the disk (D) or reproduces information recorded in the disk (D) in a state that it is located near the disk (D) according to an aerodynamic flying force.

Figure 2:
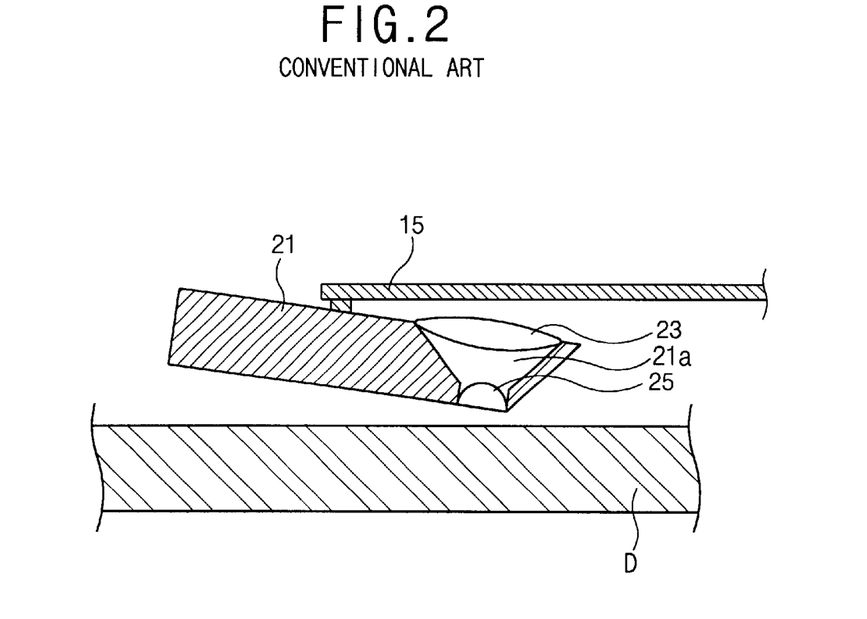
FIG. 2 is a sectional view showing the optical head for a near field recording in accordance with the conventional art.

In detail, with reference to FIG. 2, the optical head 20 includes a slider 21 having a collecting hole 21a in the vertical direction through which light is transmitted and being installed at an end portion of the suspension 15, an objective lens 23 being installed at an upper side of the collecting hole 21a of the slider 21 and refracting incident light, and a collective lens 25 being installed at a lower side of the collecting hole 21a of the slider 21, collecting light transmitting the objective lens 23 and forming a spot at an upper surface of the disk (D).

In such an optical head 20, in a state that the slider 21 is positioned at the upper surface of the disk (D) owing to aerodynamic flying force, the incident light is much refracted as passing the objective lens 23 and the collective lens 25 and a spot below a diffraction limitation is formed on the disk (D), so that a high density recording and reproducing can be accomplished.

In such a near field optical head as described above, however, while the slider 21 is travelling over the disk (D) to perform a recording/reproducing operation of information on the disk (D), a foreign substance such as a powder possibly created due to friction of the disk (D) or a dust in the air may be introduced on the lower surface of the slider 21 according to the rotation of the disk (D).

Figure 3:
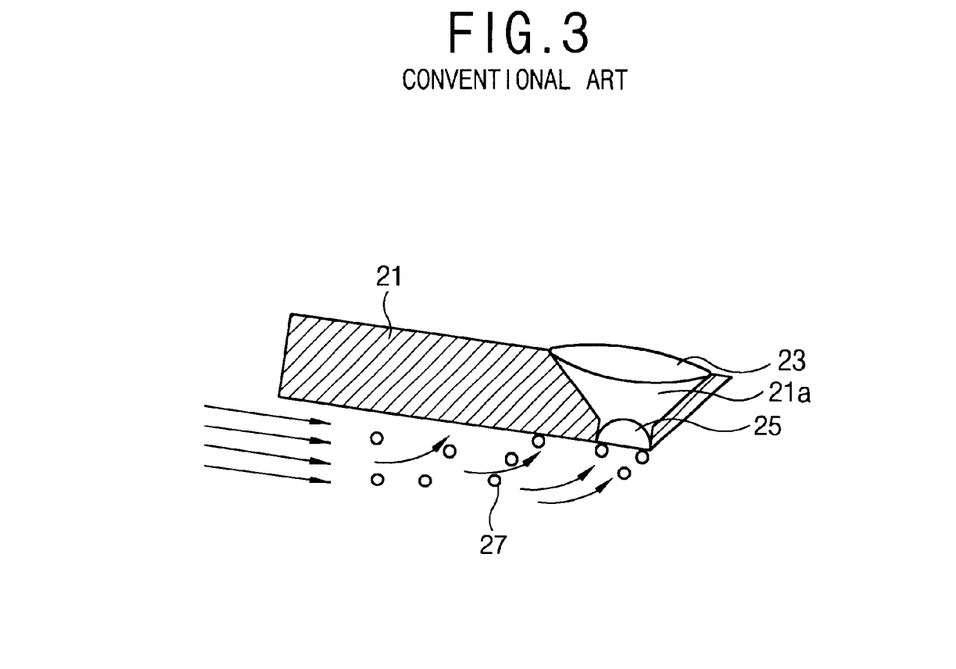
FIG. 3 is a sectional view showing how foreign substances cling to a collective lens of the optical head for a near field recording in accordance with the conventional art.

Accordingly, as the collective lens travels over the disk over an extended period of time, the foreign substances 27 cling to the surface of the collective lens 25 of the slider 21, contaminating the collective lens 25.

As the collective lens 25 is contaminated, the light output through the collective lens 25 is degraded to cause a problem in recording/reproducing information.

Especially, compared to the conventional far field optical system, in a near field optical system, the spot formed through the collective lens 25 is formed having a diameter below a diffraction limitation of light, the contamination of the collective lens 25 has much influence on the formation of the spot.

In addition, since an evanescent wave is used in recording/reproducing, if there exist foreign substances at the movement path of light, a bad influence is made on the transfer of an optical energy.

That is, a spot of light through the collective lens is not properly formed when information is recorded, while an error occurs in detecting a recording mark when information is reproduced, which is fatally defective in recording/reproducing information.

SUMMARY OF THE INVENTION

Therefore, an object of the present invention is to provide a contamination preventing device of an optical head for near field recording that is capable of preventing contamination of a collective lens of a slider while recording/reproducing of information is performed on a disk, thereby improving recording/reproducing performance of a near field optical recording apparatus.

Another object of the present invention is to provide a simple contamination preventing device to improve a productivity of a near field optical recording apparatus.

To achieve these and other advantages and in accordance with the purpose of the present invention, as embodied and broadly described herein, there is provided a contamination preventing device of an optical head for near field recording including: a slider being supported by a suspension in a deck and having a collective hole vertically penetrated though which a light source is transmitted; a collective lens being installed at a lower portion of the collective hole of the slider, collecting light generated from the light source and forming a spot at an upper surface of a recording medium; and a lens contaminant removing unit removing a foreign substance clung to the collective lens.

The contamination preventing device of an optical head for near field recording may additionally include an objective lens being installed at an upper side of the collecting hole and refracting an incident light, besides the collective lens.

In the contamination preventing device of an optical head for near field recording of the present invention, the collective lens includes every kind of lenses that would allow a near field optical magnetic interaction, and especially, includes a solid immersion lens.

To achieve the above objects, there is further provided a near field recording apparatus including: a lens making light incident on a recording medium and transmitting reflected light; a head slider mounting the lens; a suspension arm connecting the head slider; a pick-up unit supporting the suspension arm; a driving unit being connected to the pick-up unit and allowing the head slider to rotate; and a deck isolating each element from outside.

In the contamination preventing device of an optical head for near field recording of the present invention, as the lens contaminant removing unit, a ultrasonic vibrator, a dust collection electrode and a lens cleaner are used.

To achieve the above objects, there is further provided a contamination preventing device of an optical head for a near field recording, including: a slider being supported by a suspension in a deck and having a collective hole vertically penetrated though which a light source is transmitted; a collective lens being installed at a lower side of the collective hole of the slider to collect light passing an objective lens and form a spot at an upper surface of the disk; and a contamination preventing unit for resonating the slider with a high frequency so as to prevent clinging of a foreign substance to the collective lens.

To achieve the above objects, there is further provided a contamination preventing device of an optical head for a near field recording, including: a slider being supported by a suspension in a deck and having a collective hole vertically penetrated though which a light source is transmitted; a collective lens being installed at a lower side of the collective hole of the slider to collect light passing an objective lens and form a spot at an upper surface of the disk; a dust collection electrode for collecting foreign substances around the slider so as to prevent contamination of the collective lens by the foreign substances.

To achieve the above objects, there is further provided a contamination preventing device of an optical head for a near field recording, including: a slider being supported by a suspension in a deck and having a collective hole vertically penetrated though which a light source is transmitted; a collective lens being installed at a lower side of the collective hole of the slider to collect light passing an objective lens and form a spot at an upper surface of the disk; and a lens cleaner being installed in the deck so as to prevent contamination of the collective lens by the foreign substances.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
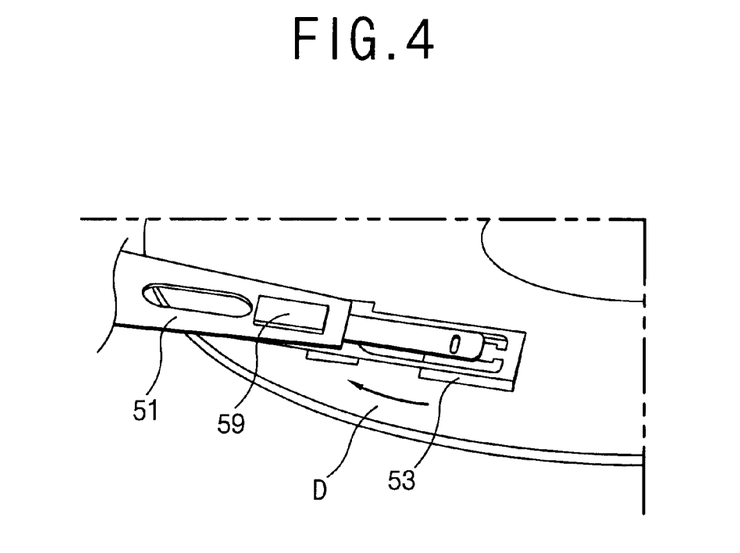
FIG. 4 is a perspective view showing a contamination preventing device of an optical head for a near field recording in accordance with a preferred embodiment of the present invention.
Figure 5:
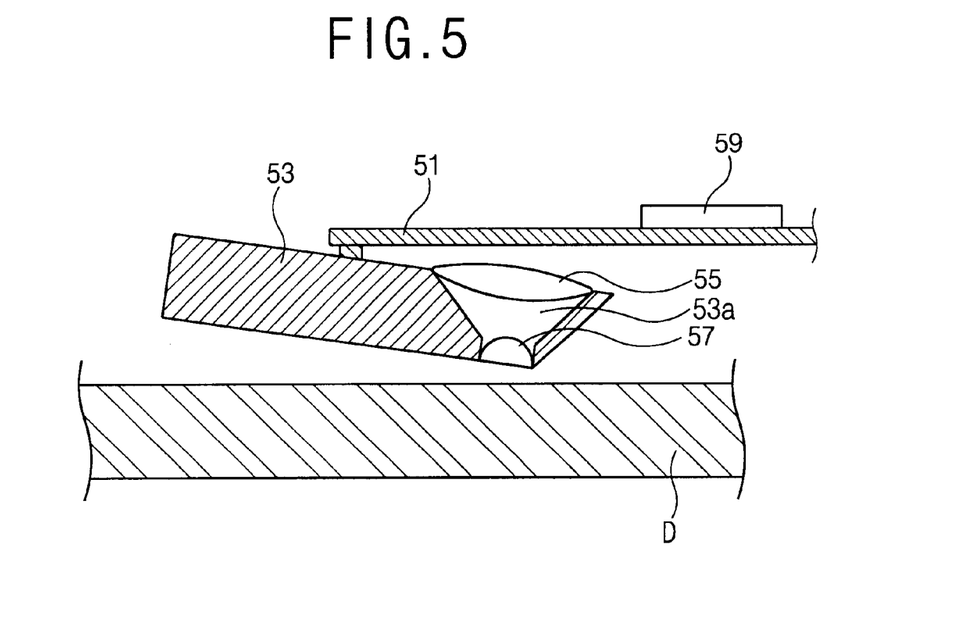
FIG. 5 is a sectional view showing a contamination preventing device of an optical head for a near field recording in accordance with a first embodiment of the present invention.

FIG. 4 is a perspective view showing a contamination preventing device of an optical head for a near field recording in accordance with a preferred embodiment of the present invention, and FIG. 5 is a sectional view showing a contamination preventing device of an optical head for a near field recording in accordance with a first embodiment of the present invention.

With reference to FIGS. 4 and 5, a contamination preventing device of an optical head for a near field recording of the present invention includes: an optical head for a near field recording, including: a slider 53 being supported by a suspension 51 in a driver and having a collective hole 53a vertically penetrated though which a light source is transmitted; an objective lens 55 being installed at an upper side of the collective hole 53a of the slider 53 and refracting an incident light; a collective lens 57 being installed at a lower side of the collective hole 53a of the slider 53 to collect light passing the objective lens 55 and form a spot at an upper surface of the disk (D); and a contaminating preventing unit resonating the slider 53 with a high frequency and preventing clinging of foreign substances to the collective lens 57.

The contamination preventing unit is an ultrasonic oscillator 59 which is installed at the suspension 51 and generate an ultrasonic vibration, thereby high-frequency resonating the slider 53.

The ultrasonic oscillator 59 may be installed at the slider 53, not at the suspension 51.

As the ultrasonic oscillator 59, a piezoceramic crystals is preferred which causes an ultrasonic vibration upon receiving a voltage.

The slider of the present invention includes the collective lens and the objective lens, but only the collective lens may be installed without the objective lens.

The operation of the contamination preventing device of an optical head for a near field recording constructed as described above will now be explained.

First, after the recording/reproducing operation of information is performed on the disk (D), when a predetermined time elapses, foreign substances such as a friction powder of the disk (D) or dust cling to the surface of the collective lens 57 of the slider 53, contaminating the collective lens 57.

When the collective lens 57 is contaminated, a voltage is applied to the ultrasonic oscillator 59 installed at the suspension 51 to generate scores of kHz ultrasonic vibration, so as to resonate the slider 53 with high frequency.

When the slider 53 is high-frequency resonated, the foreign substances is prevented from clinging onto the surface of the collective lens 57 and foreign substances already clinging on the surface of the collective lens 57 come off. Thus, the collective lens 57 is prevented from being contaminated.

Figure 6:
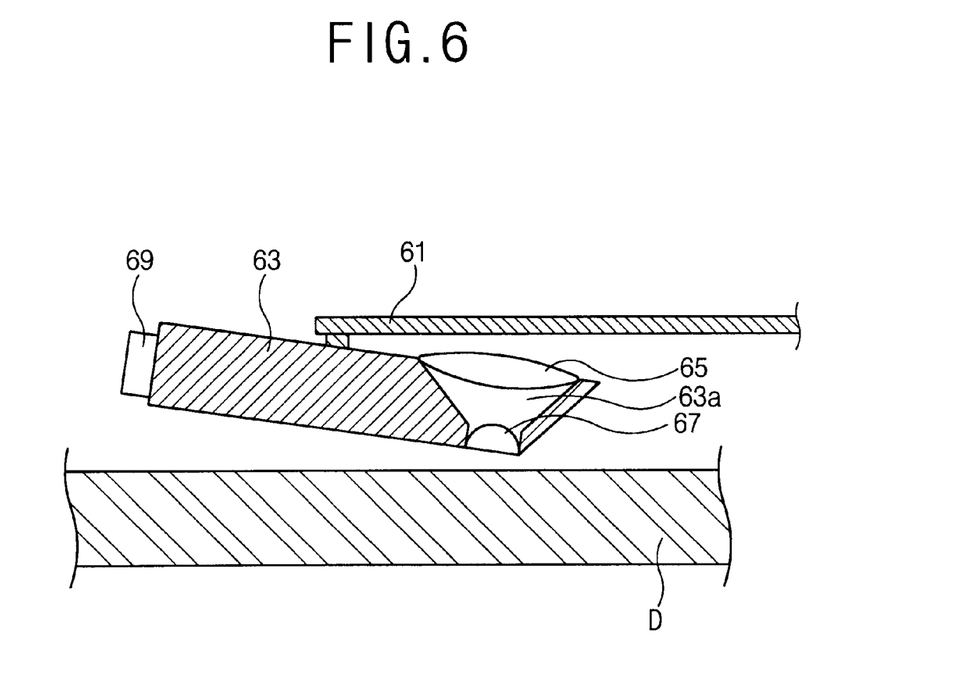
FIG. 6 is a sectional view showing a contamination preventing device of an optical head for a near field recording in accordance with a second embodiment of the present invention.

FIG. 6 is a sectional view showing a contamination preventing device of an optical head for a near field recording in accordance with a second embodiment of the present invention.

As shown in FIG. 6, an optical head for near field recording in accordance with the second embodiment of the present invention includes: a slider 63 being supported by a suspension 61 in a driver and having a collective hole 63a vertically penetrated though which a light source is transmitted; an objective lens 65 being installed at an upper side of the collective hole 63a of the slider 63 and refracting an incident light; a collective lens 67 being installed at a lower side of the collective hole 63a of the slider 63 to collect light passing the objective lens 65 and form a spot at an upper surface of the disk (D); and a foreign substance collecting unit for collecting foreign substances around the slider 63 so that the collective lens 67 is prevented from contaminating by the foreign substances.

The foreign substance collecting unit is a dust collection electrode 69 installed at the slider and charged with static electricity to collect foreign substances around the slider.

The dust collection electrode may be installed at the suspension 61, not at the slider 63. Also, though the collective lens and the objective lens are mounted together at the slider in the present invention, only the collective lens may be installed without the objective lens.

In the contamination preventing device of an optical field for near field recording constructed as described above, while the slider 63 travels over the disk (D) to perform a recording/reproducing operation of information on the disk (D), the foreign substance around the slider 63 is collected by the dust collection electrode 69 charged with static electricity.

That is, when the slider 63 travels over the disk (D), air mixed with foreign substances such as powder created as the disk (D) is abraded according to the rotation of the disk (D) or dust are introduced onto the surface of the slider 63, of which the foreign substances are collected by the dust collection electrode 69 and removed.

By doing that, the collective lens 67 is prevented from being contaminated due to the foreign substances, and the foreign substances collected by the dust collection electrode 69 are shaken to be removed by a dust remover after a predetermined time elapses.

A near field optical recording device in accordance with a third embodiment of the present invention includes: a collective lens making light incident on a recording medium and transmitting a reflected light; a head slider mounting the collective lens; a suspension arm for connecting the head slider; a pick-up unit supporting the suspension arm; a driving unit being connected to the pick-up unit and allowing the head slider to rotate; a deck isolating each element from outside; a lens cleansing unit installed in the deck.

The lens cleansing unit is fixed at one side of an inner wall of the deck, and a roller type cleaner is connected by a support unit from the inner wall of the deck.

The lens cleansing unit may be connected to the driving unit and reciprocally moved.

Figure 7:
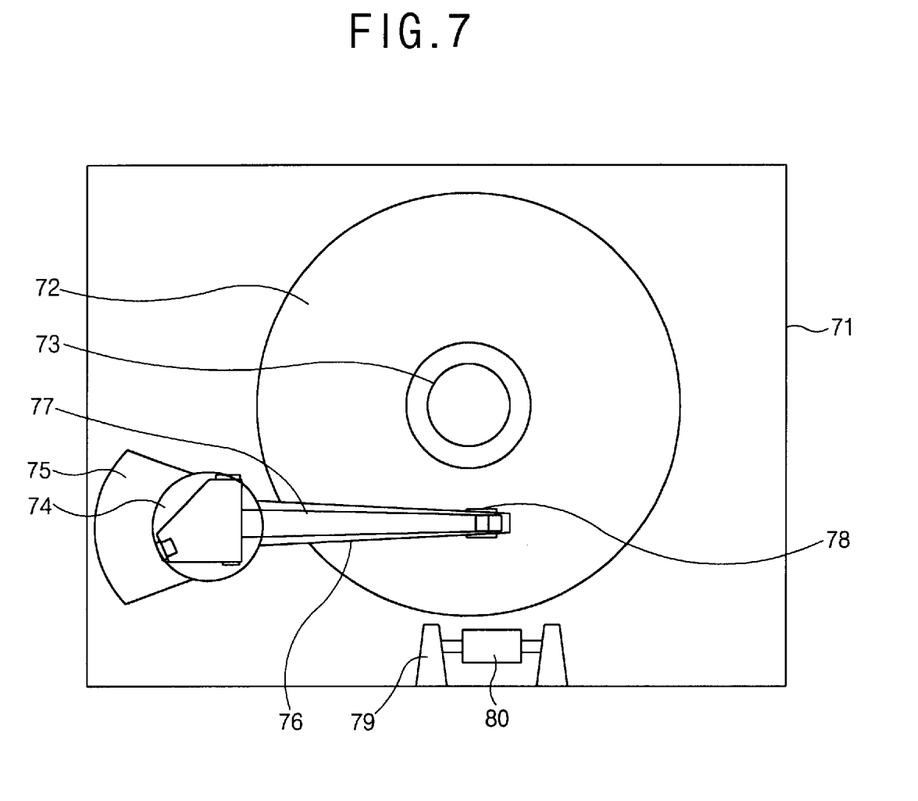
FIG. 7 is a sectional view showing a contamination preventing device of an optical head for a near field recording in accordance with a third embodiment of the present invention.

FIG. 7 is a sectional view showing a contamination preventing device of an optical head for a near field recording in accordance with a third embodiment of the present invention.

As shown in FIG. 7, a disk 72 and a recording device are installed in a deck 71. The recording device includes a pick-up unit 74 rotatable at a predetermined angle by a VC motor, that is, a drive unit, a suspension 76 and a fixed arm 77 which are extended from the pick-up unit to a certain portion of the disk.

A prism (not shown) for changing light path is installed at one end of the fixed arm, and a head slider mounting a lens is mounted at one end of the suspension arm.

Meanwhile, a lens cleaner is installed at one side of the inner wall side of the deck. The cleaner may be embodied into various forms, but in the present invention, it includes a support unit 79 fixed at the inner wall of the deck and a roller type cleaner 80 being fixed by the support and rotatable.

The cleaner removes contaminant substance clinging at the surface of the lens by being abraded with the lens by coating a cleaning substance or attaching a non-woven fabric on the cleaner.

Figure 8:
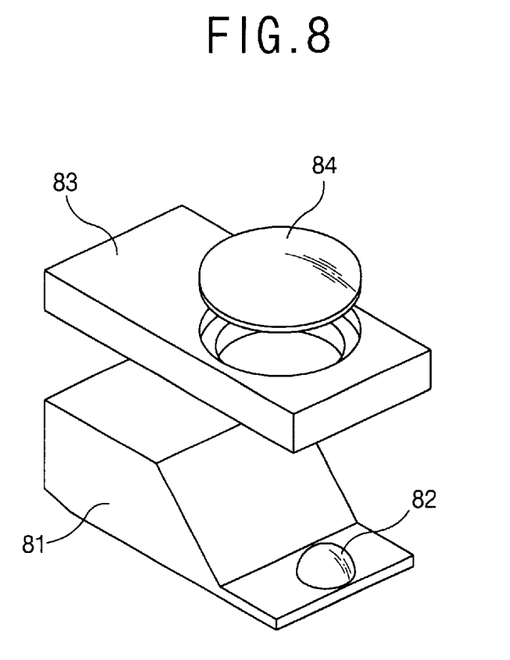
FIG. 8 is a perspective view showing a head slider.

FIG. 8 is a perspective view showing one example of a head slider.

As shown in FIG. 8, a collective lens 82, which is adjacent to a recording medium, is mounted at one side of a slider 81, and a frame 83, and an objective lens 84 and a frame 83 on which the objective lens is mounted are installed at an upper portion of the slider.

A head slider is mounted at one end of the suspension arm 76 of FIG. 7 and rotated at a predetermined angle as it flies over the surface of the recording medium according to the rotation of the pick-up unit which fixes the other end of the suspension arm. The head slider allows an optical interaction to the recording medium.

A lower surface of the lens mounted at a lower portion of the slider is cleaned automatically or manually by a lens cleaner of the present invention.

The operation of cleaning will now be described with reference to FIG. 9.

Figure 9:
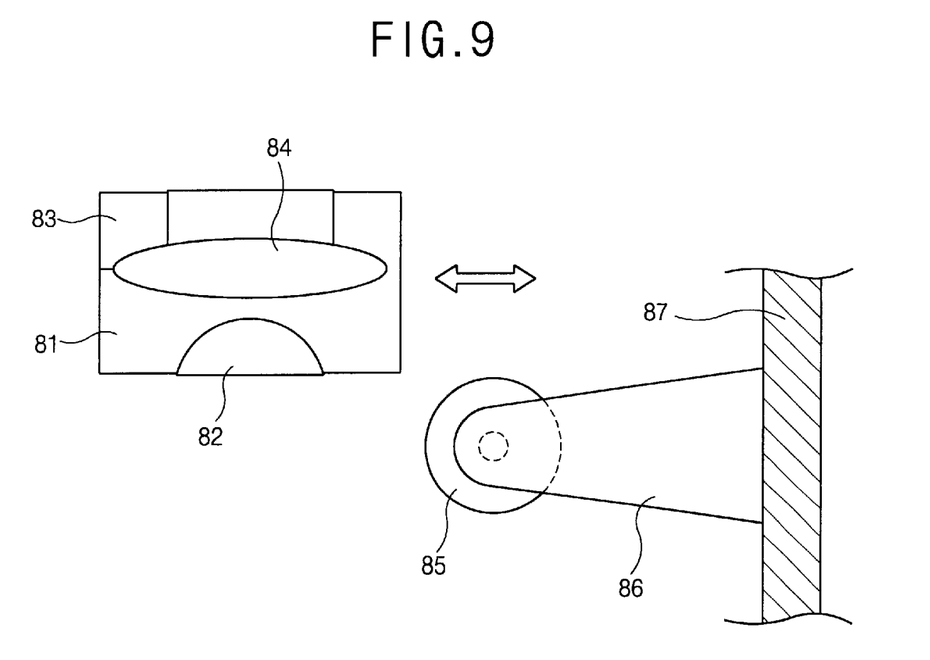
FIG. 9 is a schematic view showing a lens cleansing operation in accordance with the preferred embodiment of the present invention.

FIG. 9 is a schematic view showing a lens cleansing operation in accordance with the preferred embodiment of the present invention.

As shown in FIG. 9, a cleaner 85 is positioned at a trajectory of the slider at the outer side of the disk.

When the operation for cleaning is automatically inputted by a user or at certain intervals, the VC motor 75 of FIG. 7 is driven to allow the slider 81 to be positioned at an upper surface of the cleaner. And then, the VC motor is reciprocally moved at regular intervals so that the slider can be reciprocally moved at the upper portion of the cleaner.

According to this operation, the lower surface of the collective lens 82 mounted at a lower portion of the slider is contacted by the cleaner and clean cleansed. The contact between the slider and the cleaner maintains a certain frictional force by an elastic force of the suspension arm 76 of FIG. 7.

The lens cleansing operation may be controlled by an additional contamination sensing unit, for example, a microcomputer.

That is, when an error occurs in a recording reproducing signal as the surface of the collective lens mounted at the slider is contaminated, the microcomputer determines whether the error was caused due to contamination of the lens. If the error was caused due to the contamination of the lens, the microcomputer performs a cleaning operation.

When a command of the cleaning operation is given, the slider driven by the VC motor is taken outside the disk and moved to the position where the cleaner is mounted. After the slider is moved to the cleaner, the VC motor is rotated at a predetermined angle so that the lower surface of the collective lens can produce with the surface of the cleaner.

After the cleansing operation, the VC motor is returned to its original position of the upper surface of the disk.

As aforementioned, the cleaner, the lens cleansing unit, is fixed at the inner wall of the deck, but a driving unit may be connected to the cleaner so that the cleaner itself can be reciprocally moved. In such a case, the slider may be positioned at a certain area outside the recording medium and the cleaner is reciprocally moved at the lower surface of the slider, thereby allowing the cleansing operation.

As so far described, the contamination preventing device of an optical head for a near field recording of the present invention has the following advantage.

That is, when the surface of the collective lens mounted at the slider is exposed to contaminant substances while performing interaction with the surface of the recording medium in the near field optical recording or reproducing, the lens surface can be easily cleansed to remove the contaminant of the surface of the lens immediately.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A contamination preventing device of an optical head for near field recording comprising:
    a slider supported by a suspension in a deck and having a collective hole vertically penetrating through which a light source is transmitted;
    a collective lens installed at a lower portion of the collective hole of the slider, collecting light generated from the light source and forming a spot at an upper surface of a recording medium; and
    an ultrasonic oscillator to resonate the slider with a frequency in order to decontaminate the collective lens.

2. The device of claim 1, further comprises an objective lens being installed at an upper portion of the collective hole of the slider and refracting an incident light.

3. The device of claim 1, wherein the collective lens is a solid immersion lens.

4. The device of claim 1, wherein the ultrasonic oscillator is installed on the suspension.

5. The device of claim 1, wherein the ultrasonic oscillator is installed on the slider.

6. The device of the claim 1, wherein the ultrasonic oscillator comprises a piezoceramic crystal.

7. The device of claim 1, further comprising:
    a lens contamination sensing means; and
    a lens contamination controlling means.

8. A contamination preventing device of an optical head for near field recording comprising:
    a slider supported by a suspension in a deck and having a collective hole vertically penetrating through which a light source is transmitted;
    a collective lens installed at a lower portion of the collective hole of the slider, collecting light generated from the light source and forming a spot at an upper surface of a recording medium;
    an ultrasonic oscillator to resonate the slider with a frequency in order to decontaminate the collective lens; and
    a charged electrode installed on the slider to further decontaminate the collective lens.

9. The device of claim 8, wherein the charged electrode is charged with static electricity.

10. A contamination preventing device of an optical head for near field recording comprising:
    a slider supported by a suspension in a deck and having a collective hole vertically penetrating through which a light source is transmitted;
    a collective lens installed at a lower portion of the collective hole of the slider, collecting light generated from the light source and forming a spot at an upper surface of a recording medium;
    an ultrasonic oscillator to resonate the slider with a frequency in order to decontaminate the collective lens; and
    a charged electrode installed on the suspension to further decontaminate the collective lens.

11. The device of claim 10, wherein the charged electrode is charged with static electricity.

12. A contamination preventing device of an optical head for near field recording comprising:
    a collective lens that focuses light incident to a recording medium and transmits a reflected light;
    a slider upon which the collective lens is mounted;
    a pick up means having a light source and light modulation means;
    a suspension arm supporting the slider and connecting the slider to the pick up means;
    a driver disposed at the pick up means and allowing a head slider to be rotated;
    a deck isolating each element from outside; and
    an ultrasonic oscillator to resonate the slider with a frequency in order to decontaminate the collective lens.

13. The device of claim 12, further comprising an objective lens installed above the collective lens to refract the incident light.

14. The device of claim 12, wherein the collective lens is a solid immersion lens.

15. The device of claim 12, wherein the ultrasonic oscillator is installed on the suspension.

16. The device of claim 12, wherein the ultrasonic oscillator is installed on the slider.

17. The device of the claim 12, wherein the ultrasonic oscillator comprises a piezo-ceramic crystal.

18. A contamination preventing device of an optical head for near field recording comprising:
- a collective lens that focuses light incident to a recording medium and transmits a reflected light;
- a slider upon which the collective lens is mounted;
- a pick up device having a light source to transmit and modulate light;
- a suspension arm supporting the slider and connecting the slider to the pick up device;
- a driver disposed at the pick up device and allowing a head slider to be rotated;
- a deck isolating each element from the outside environment;
- an ultrasonic oscillator to resonate the slider with a frequency in order to decontaminate the collective lens; and
- a charged electrode installed on the slider to further decontaminate the collective tens.

19. The device of claim 18, further comprising an objective lens installed above the collective lens to refract the incident light.

20. The device of claim 18, wherein the collective lens is a solid immersion lens.

21. A contamination preventing device of an optical head for near field recording comprising:
- a collective lens that focuses light incident to a recording medium and transmits a reflected light;
- a slider upon which the collective lens is mounted;
- a pick up device having a light source to transmit and modulate light;
- a suspension arm supporting the slider and connecting the slider to the pick up device;
- a driver disposed at the pick up device and allowing a head slider lobe rotated;
- a deck isolating each element from the outside environment;
- an ultrasonic oscillator to resonate the slider with a frequency in order to decontaminate the collective lens; and
- a charged electrode installed on the suspension arm to further decontaminate the collective lens.

22. The device of claim 21, further comprising an objective lens installed above the collective lens to refract the incident light.

23. The device of claim 21, wherein the collective lens is a solid immersion lens.

* * * * *